(12) United States Patent
Sato et al.

(10) Patent No.: US 7,605,931 B2
(45) Date of Patent: Oct. 20, 2009

(54) IMAGE FORMING APPARATUS INCLUDING POWER SAVING CONTROL AND JOB SCHEDULING AND CONTROL METHOD THEREFOR

(75) Inventors: Mitsuhiko Sato, Kashiwa (JP); Keizo Isemura, Koganei (JP); Ichiro Sasaki, Toride (JP); Hidenori Sunada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 11/192,443

(22) Filed: Jul. 28, 2005

(65) Prior Publication Data
US 2006/0023245 A1 Feb. 2, 2006

(30) Foreign Application Priority Data
Jul. 29, 2004 (JP) ............................. 2004-221820

(51) Int. Cl.
G06K 15/00 (2006.01)
G06F 1/00 (2006.01)

(52) U.S. Cl. ................ 358/1.14; 358/1.15; 713/300; 718/100; 710/29; 399/70

(58) Field of Classification Search ................ 358/1.1, 358/2.1, 1.9, 1.13–1.15; 713/300–340; 718/100–108; 710/29; 700/1, 286, 291, 295–297; 399/70, 399/88
See application file for complete search history.

(56) References Cited

U.S. PATENT DOCUMENTS 5,604,600 A * 2/1997 Webster ...................... 358/296
6,094,546 A * 7/2000 Nakazato et al. ................ 399/1
7,116,434 B2 * 10/2006 Abe ........................... 358/1.15
7,382,474 B2 * 6/2008 Motosugi et al. ........... 358/1.14
2001/0044868 A1 * 11/2001 Roztocil et al. .............. 710/129
2002/0054316 A1 * 5/2002 Abe ........................... 358/1.14
2003/0053112 A1 * 3/2003 Motosugi et al. ........... 358/1.14
2004/0179230 A1 * 9/2004 Kitada et al. ................ 358/1.15
2005/0243365 A1 * 11/2005 Noda ......................... 358/1.15

FOREIGN PATENT DOCUMENTS

JP 8-295065 A 11/1996

OTHER PUBLICATIONS

Yakayama Tsutomu , JP 08295065, English Translation.*

* cited by examiner

Primary Examiner—Twyler L Haskins
Assistant Examiner—Dennis Dicker
(74) Attorney, Agent, or Firm—Rossi, Kimms & McDowell, LLP

(57) ABSTRACT

An image forming apparatus which is capable of bringing processing devices, such as sheet feed devices and post-processing devices connected respectively to the image forming apparatus, into operable states in timing optimal for carrying out an image forming job, thereby improving productivity and operation rate of the image forming apparatus as well as saving energy. A print job is analyzed to determine at least one sheet feed device and at least one post-processing device to be used in executing the print job, and states of the determined devices are checked to determine at least one of the sheet feed device and the post-processing device to be caused to start a preparatory operation in advance before the print job is executed. Power supply to the at least one of the sheet feed device and the post-processing device is turned on in timing such that the preparatory operation is completed in time for the start of execution of the print job.

10 Claims, 14 Drawing Sheets

FIG. 9

| DEVICE NAME | STATE | PREPARATION PERIOD | SCHEDULED TURN-ON TIME POINT | TURN-OFF REQUEST |
|---|---|---|---|---|
| FIN | DOWN | 0min | – | – |
| BOOK | DOWN | 10min | – | PRESENT |
| STK | RUNNING | 0min | – | – |
| INS | DOWN | 20min | 11:34 | – |
| POD1 | RUNNING | 0min | – | ABSENT |
| POD2 | DOWN | 5min | – | – |
| POD3 | DOWN | 20min | – | – |

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB3 (STANDBY) | POD1 | — | STK | 10min | 11:44 |

FIG. 10B

| JOB4 | POD1 | INS | STK | 5min | — |
|---|---|---|---|---|---|

FIG. 10C

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB3 (STANDBY) | POD1 | — | STK | 10min | 11:44 |
| JOB4 (STANDBY) | POD1 | INS | STK | 5min | 11:54 |

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |

| JOB3 (STANDBY) | POD1 | INS | STK | 10min | — |
|---|---|---|---|---|---|

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB3 (STANDBY) | POD1 | INS | STK | 10min | 11:50 |

| JOB4 (STANDBY) | POD1 | — | STK | 5min | — |
|---|---|---|---|---|---|

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB3 (STANDBY) | POD1 | INS | STK | 10min | 11:50 |
| JOB4 (STANDBY) | POD1 | — | STK | 5min | 12:00 |

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB4 (STANDBY) | POD1 | — | STK | 5min | 11:44 |
| JOB3 (STANDBY) | POD1 | INS | STK | 10min | 11:50 |

FIG. 12

| JOB NAME | SHEET FEED DEVICE 1 | SHEET FEED DEVICE 2 | SHEET DISCHARGE DEVICE | PROCESSING PERIOD | SCHEDULED START TIME POINT |
|---|---|---|---|---|---|
| JOB1 (RUNNING) | POD1 | — | STK | 5min | 11:29 |
| JOB2 (STANDBY) | POD1 | — | STK | 10min | 11:34 |
| JOB4 (STANDBY) | POD1 | — | STK | 5min | 11:44 |
| JOB3 (STANDBY) | POD1 | INS | STK | 10min | 11:50 |
| JOB5 (STANDBY) | POD1 | — | STK | 5min | 12:00 |
| JOB6 (STANDBY) | POD2 | — | FIN | 5min | 12:05 |

705

IMAGE FORMING APPARATUS INCLUDING POWER SAVING CONTROL AND JOB SCHEDULING AND CONTROL METHOD THEREFOR

BACKGROUND OF THE INVENTION

1. Field of the Invention

The present invention relates to an image forming apparatus, a control method therefor, and a program for implementing the control method, and more particularly to an image forming apparatus which carries out electric power saving control and job scheduling for a plurality of processing devices connected respectively to a sheet feed side and a sheet discharge side of the image forming apparatus, a control method therefor, and a program for implementing the method.

2. Description of the Related Art

Conventionally, there have been image forming apparatuses such as printers, facsimile machines, and copying machines, having a plurality of sheet feed devices (more generally, pre-processing devices) such as a sheet feed deck and an inserter on a sheet feed side thereof, and a plurality of post-processing devices such as a finisher and a sorter on a sheet discharge side thereof. An image forming apparatus of this type turns on all pre-processing devices and post-processing devices before a job is carried out in order to bring these processing devices in operable states. On this occasion, if there are processing devices which are not used to carry out the job, these devices waste electric power.

Japanese Laid-Open Patent Publication (Kokai) No. H08-295065 discloses an image forming apparatus comprised of a sorter section, which is a function block constituting a post-processing device, and other function blocks. The function blocks except for the sorter section include a scanner section, an image processing section, an image forming section, a FAX section, and an expanding section that expands image data and then outputs the expanded image data to the image processing section. The sorter section sorts printed sheets output from the image forming section into predetermined trays. The image forming apparatus has switch circuits provided for the respective function blocks to independently supply electric power to the respective function blocks, thereby reducing electric power consumption. For example, the switch circuits corresponding, respectively, to the sorter section, the image processing section, the image forming section, and the expanding section are closed in a sort mode to supply electric power to these function blocks while power supply is shut off to the other blocks, thereby reducing the electric power consumption to the minimum possible.

However, in the conventional image forming apparatus, a CPU of the image-forming apparatus starts power supply to the function blocks (processing devices) used to carry out a job after receiving a job command from an external computer, and thus may not start the job immediately. Namely, the respective processing devices generally start a preparatory (warm-up) operation in response to turn-on of electric power, and start the job after the preparatory operation has been completed. A certain time period may thus be required to complete the preparatory operation depending on the preparatory operation. For example, in a finisher which glues a cover to the body of bound sheets, if a preparatory operation is carried out to heat and melt solid glue into a liquid or paste state, this preparatory operation takes a long time period.

In this way, the conventional image forming apparatus turns on power supply to the processing devices upon receiving a job command to start the preparatory operation of the processing devices, so that a long time period is required before the preparatory operation is completed, and a job is thus cannot be started immediately.

SUMMARY OF THE INVENTION

It is an object of the present invention to provide an image forming apparatus and a control method therefor which are capable of bringing processing devices, such as sheet feed devices and post-processing devices connected respectively to the image forming apparatus, into operable states in timing optimal for carrying out an image forming job, thereby improving productivity and operation rate of the image forming apparatus as well as saving energy, and a program for implementing the control method.

To attain the above object, in a first aspect of the present invention, there is provided an image forming apparatus comprising at least one sheet feed device that supplies sheets, an image forming device that forms an image on a sheet supplied from the sheet feed device by executing a print job, at least one post-processing device that carries out post-processing including bookbinding on the sheet having the image formed thereon, a receiving device that received the print job, a first determining device that analyzes the received print job and determines the sheet feed device and the post-processing device to be used in executing the print job, based on a result of the analysis, a second determining device that checks states of the determined sheet feed device and post-processing device and determines at least one of the sheet feed device and the post-processing device to be caused to start a preparatory operation in advance before the print job is executed, based on a result of the checking, and a control device that turns on power supply to the determined sheet feed device and post-processing device in timing such that the preparatory operation of the determined at least one of the sheet feed device and post-processing device is completed in time for start of execution of the print job.

Preferably, the image forming apparatus comprises a first calculating device that calculates a processing time period required for execution of the received print job, based on the print job and processing capability of the image forming device, a second calculating device that calculates a scheduled start time for starting execution of the print job, based on the calculated processing time period, and a time period required for the preparatory operation of the determined at least one of the sheet feed device and post-processing device, a storage device that stores the calculated processing time period and the calculated scheduled start time together with the received print job, and a print control device that sequentially reads out the stored print job according to the calculated scheduled start time and causes the image forming device to carry out image formation, and the control device turns on power supply to the determined at least one of the sheet feed device and post-processing device in timing such that the preparatory operation of the determined at least one of the sheet feed device and post-processing device is completed in time for the calculated scheduled start time.

More preferably, the control device causes the image forming device to execute a second print job received subsequently to the received print job, before execution of the received print job, when determining that the preparatory operation of the determined at least one of the sheet feed device and post-processing device is not completed in time for the calculated scheduled start time in sequentially reading out the stored print job according to the calculated scheduled start time and causing the image forming device to carry out image formation.

More preferably, the control device causes the image forming device to execute the received print job after completion of the preparatory operation of the determined at least one of the sheet feed device and post-processing device without executing the second print job before execution of the received print job, when determining that the image formation based on the received print job is completed later than when the second print job is not executed before execution of the received print job, due to execution of the second print job before execution of the received print job.

Preferably, the control device issues instructions for turning on or off power supply to the sheet feed device and power supply to the post-processing device, independently of each other, and the control device issues an instruction for turning on power supply to the determined at least one of the sheet feed device and post-processing device to cause the determined sheet feed device and the determined post-processing device to start the preparatory operation.

Also preferably, the sheet feed device and the post-processing device each have a request device that issues a request to the control device to permit switching of power supply to a corresponding one of the sheet feed device and the post-processing device when power supply to the corresponding one of the sheet feed device and the post-processing device is to be switched, and the control device does not accept the request from the request device when determining that the sheet feed device or the post-processing device, of which the request device has issued the request, is required for execution of the print job stored in the storage device.

More preferably, when the control device does not accept the request for permission of switching of power supply from the request device, the control device stores the request in the storage device, and reads out the stored request and turns off power supply to the sheet feed device or the post-processing device that issued the request, upon completion of execution of the print job using the sheet feed device or the post-processing device that issued the request.

With the construction according to the first aspect, it is possible to bring processing devices into operable states in timing optimal for carrying out an image forming job, thereby improving productivity and operation rate of the image forming apparatus as well as saving energy.

To attain the above object, in a second aspect of the present invention, there is provided a control method for an image forming apparatus including at least one sheet feed device that supplies sheets, an image forming device that forms an image on a sheet supplied from the sheet feed device by executing a print job, at least one post-processing device that carries out post-processing including bookbinding on the sheet having the image formed thereon, and a receiving device that received the print job, the control method comprising a first determining step of analyzing the received print job and determining the sheet feed device and the post-processing device to be used in executing the print job, based on a result of the analysis, a second determining step of checking states of the determined sheet feed device and post-processing device and determining at least one of the sheet feed device and the post-processing device to be caused to start a preparatory operation in advance before the print job is executed, based on a result of the checking, and a control step of turning on power supply to the determined at least one of sheet feed device and post-processing device in timing such that the preparatory operation of the determined at least one of sheet feed device and post-processing device is completed in time for start of execution of the print job.

Preferably, the control method comprises a calculating step of calculating a processing time period required for execution of the received print job, based on the print job and processing capability of the image forming device, and calculating a scheduled start time for starting execution of the print job, based on the calculated processing time period, and a time period required for the preparatory operation of the determined at least one of the sheet feed device and post-processing device, a storage step of storing the calculated processing time period and the calculated scheduled start time in a storage device together with the received print job, and a print control step of sequentially reading out the stored print job according to the calculated scheduled start time and causing the image forming device to carry out image formation, and in the control step, power supply to the determined at least one of the sheet feed device and post-processing device is turned on in timing such that the preparatory operation of the determined at least one of the sheet feed device and post-processing device is completed in time for the calculated scheduled start time.

More preferably, in the control step, the image forming device is caused to execute a second print job received subsequently to the received print job, before execution of the received print job, when it is determined that the preparatory operation of the determined at least one of the sheet feed device and post-processing device is not completed in time for the calculated scheduled start time in sequentially reading out the stored print job according to the calculated scheduled start time and causing the image forming device to carry out image formation.

More preferably, in the control step, the image forming device is caused to execute the received print job after completion of the preparatory operation of the determined at least one of the sheet feed device and post-processing device without executing the second print job before execution of the received print job, when it is determined that the image formation based on the received print job is completed later than when the second print job is not executed before execution of the received print job, due to execution of the second print job before execution of the received print job.

Preferably, the control step includes a step of issuing instructions for turning on or off power supply to the sheet feed device and power supply to the post-processing device, independently of each other, and in the control step, an instruction is issued for turning on power supply to the determined at least one of the sheet feed device and post-processing device to cause the determined at least one of the sheet feed device and post-processing device to start the preparatory operation.

Also preferably, in the control step, a request for permission of switching of power supply from the sheet feed device or the post-processing device is not accepted when it is determined that the sheet feed device or the post-processing device, which has issued the request, is required for execution of the print job stored in the storage device.

More preferably, when in the control step, the request for permission of switching of power supply is not accepted, in the control step, the request is stored in the storage device, and the stored request is read out and power supply to the sheet feed device or the post-processing device that issued the request is turned off, upon completion of execution of the print job using the sheet feed device or the post-processing device that issued the request.

In a third aspect of the present invention, there is provided a program which carries out the control method according to the second aspect.

The above and other objects, features, and advantages of the invention will become more apparent from the following detailed description taken in conjunction with the accompanying drawings.

BRIEF DESCRIPTION OF THE DRAWINGS

FIG. 9 is a diagram showing an information list provided in the print controller, and indicative of respective states of devices constituting sheet feed/discharge devices;

FIG. 10A is a diagram showing an example of a job list;

FIG. 10B is a diagram showing a newly received job;

FIG. 10C is a diagram showing a job list updated according to the newly received job;

FIGS. 11A to 11F are diagrams useful in explaining an example of job scheduling carried out in a step S510 in FIG. 5, in which:

FIG. 11A is a diagram showing a job list;

FIG. 11B is a diagram showing a first newly received job;

FIG. 11C is a diagram showing a job list after the first newly received job is added;

FIG. 11D is a diagram showing a second newly received job;

FIG. 11E is a diagram showing a job list generated on the assumption that the second newly received job is carried out subsequently to the first newly received job; and FIG. 11F is a diagram showing a job list generated by updating the job list shown in FIG. 11C with addition of the second newly received job to be carried out prior to the first newly received job;

FIG. 12 is a diagram showing a job list useful in explaining an operation upon a request for turning off power supply; and FIGS. 13A to 13C are perspective views useful in explaining a bookbinding process for bookbinding a printed sheet bundle carried out by a case binding unit, in which:

FIG. 13A is a view showing a state where a glue application unit is applying glue to the back surface of the printed sheet bundle;

FIG. 13B is a view showing a sheet to be used as a cover; and

FIG. 13C is a view showing a book with the cover.

DETAILED DESCRIPTION OF THE PREFERRED EMBODIMENTS

The present invention will now be described in detail below with reference to the drawings showing a preferred embodiment thereof.

Figure 1:
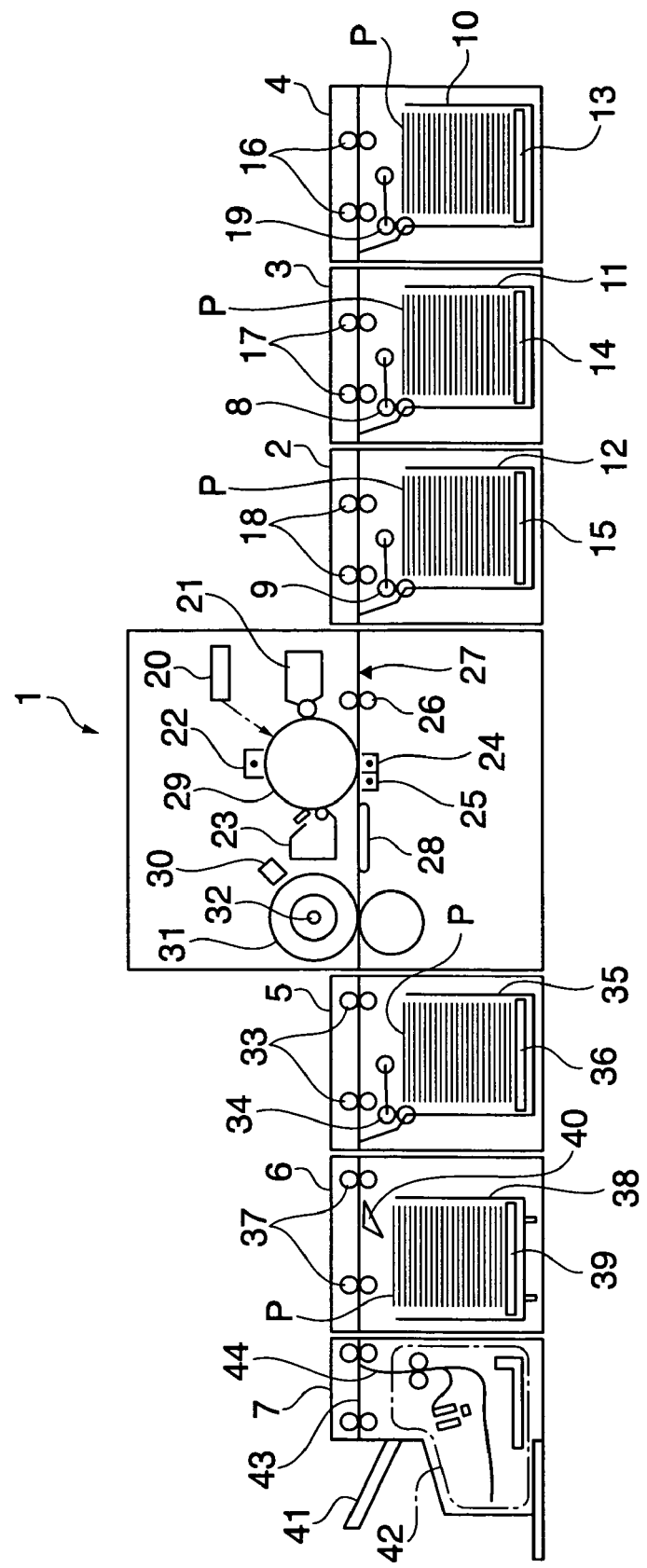
FIG. 1 is a schematic showing the overall construction of an image forming apparatus according to an embodiment of the present invention.

FIG. 1 is a schematic showing the overall construction of an image forming apparatus according to an embodiment of the present invention.

As shown in FIG. 1, an image forming system including the image forming apparatus according to the present embodiment is comprised of a main unit 1 of the image forming apparatus, first, second, and third sheet feed devices 2, 3, and 4 which store sheets P, and supply the sheets P to the main unit 1 of the image forming apparatus, and first, second, and third post-processing devices 5, 6, and 7 which perform post-processing on the sheets P on which images have been formed. In the present embodiment, all the sheet feed devices 2, 3, and 4 have the same construction. The first to third post-processing devices 5, 6, and 7 are an inserter, a stacker, and a finisher, respectively. A description will now be sequentially given of the main unit 1 of the image forming apparatus, sheet feed devices 2 to 4, and post-processing devices 5 to 7.

The main unit 1 of the image forming apparatus is provided with a photosensitive drum 29. Arranged around the photosensitive drum 29 are a primary charger 22 which uniformly charges the photosensitive drum 29, an exposing device 20 which emits light onto the photosensitive drum 29 in an exposure pattern corresponding to image data contained in a print job which the image forming apparatus has been instructed to carry out as described later, a developing device 21 which attaches toner to a latent image formed on the photosensitive drum 29 by light emitted by the exposing device 20, to thereby convert the latent image into a visible image (toner image), a transfer charger 24 which transfers the toner image formed on the photosensitive drum 29 onto the sheet P, and a separation charger 25 which separates the sheet P from the photosensitive drum 29, and a cleaner 23 which collects toner which has not been transferred and remains on the photosensitive drum 29.

The sheet feed devices 2, 3, and 4 are comprised, respectively, of storages 12, 11, and 10 which store sheets P, sheet feed rollers 9, 8, and 19 which feed the sheets P stored in the storage 12, 11, and 10 one sheet at a time, lifters 15, 14, and 13 which adjust a top position of the sheets P to a level proper for sheet feeding by the sheet feed rollers 9, 8, 19, and conveying rollers 18, 17, and 16 which convey the sheets P.

The sheet feed devices 2, 3, and 4 are each comprised of a heater and a blower, which are not shown, and supply hot air heated by the heater to the corresponding storage 12, 11, or 10 so as to adjust humidity within the storages 12, 11, and 10. The humidity adjusting control is carried out depending upon the type of the sheets P. For example, the humidity adjusting control is not carried out for ordinary sheets having a mass per unit area of approximately 64 to 105 $g/m^2$, and the humidity adjusting control is carried out for thick sheets having a mass per unit area exceeding 105 $g/m^2$.

If the heater does not attain a target temperature, the conveyance of the sheets P stacked on the sheet feed devices 2, 3, and 4 may not be started immediately depending on parameters such as the type of the sheets P stacked on the sheet feed devices 2, 3, and 4. Namely, a time period required from turn-on of power supply to the sheet feed device or issuance of a start instruction for a preparatory (warm-up) operation (such as turn-on of the heater) to a time the sheet conveying operation can be started depends on the parameters.

The sheet P fed from any of the sheet feeding devices 2, 3, and 4 to the main unit 1 of the image forming apparatus is detected by a sheet sensor 27, and abuts on a pair of registration rollers 26, where a skew of the sheet P is corrected. The sheet P is then conveyed to the transfer charger 24, where the toner image is then transferred onto the sheet P. The sheet P is then conveyed by a conveying belt 28 toward fixing rollers 31.

The fixing rollers 31 are formed of a pair of rollers. An upper roller of the fixing rollers 31 incorporates a halogen heater 32. A thermistor 30 is disposed close to the upper roller to detect the temperature of the fixing rollers 31. The halogen heater 32 serves to maintain the temperature of the fixing rollers 31 to approximately 180° C. The sheet P having passed the fixing rollers 31 is then conveyed to the inserter 5.

The inserter 5 is comprised of a storage 35 which stores sheets P, sheet feed rollers 34 which convey and feed the sheets P stored in the storage 35, a lifter 36 which lifts the sheets P to a proper position for the sheet feed rollers to feed the sheets P, and conveying rollers 33 which convey the sheets P. With this construction, the inserter 5 conveys a sheet P conveyed from the main unit 1 of the image forming apparatus or fed from the storage 35 to a downstream side thereof.

The stacker 6 is comprised of a storage 38 which stores sheets P, a stacking tray 39 on which sheets P are stacked in the storage 38, conveying rollers 37 which convey the sheets P, and a flapper 40 which switches a conveying path for the sheets P. The stacker 6 loads the sheets P in the storage 38, or conveys the sheets P downstream of the stacker 6 according to the conveying path switched by the flapper 40.

The finisher 7 includes a discharge tray 41 on which sheets P are stacked, and loads the sheets P discharged from the stacker 6 onto the discharge tray 41 via a conveying path 43. A section 42 in the finisher 7 enclosed by a one-dot chain line in FIG. 1 denotes a case binding device, which carries out case binding on the sheets P conveyed via a conveying path 44. The case binding is a type of bookbinding in which, for example, glue is applied to the back of a printed sheet bundle of sheets P of A4 size, and the bundle is encased in a cover of A3 size, with excessive parts of the cover cut away. A description will now be given of a bookbinding process for bookbinding a printed sheet bundle carried out by the case binding unit with reference to FIGS. 13A to 13C.

Figure 13A:
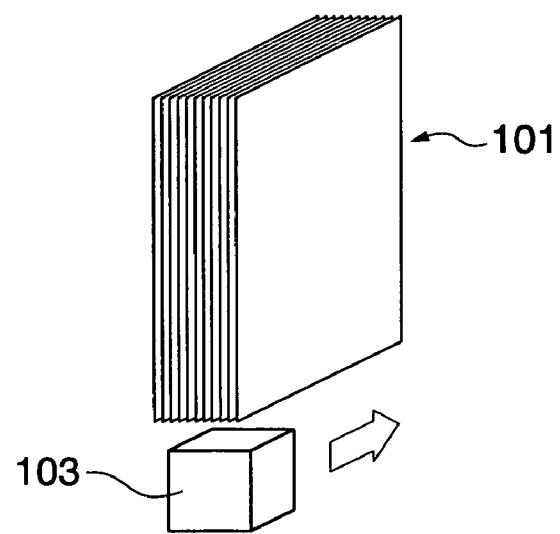
Figure 13B:
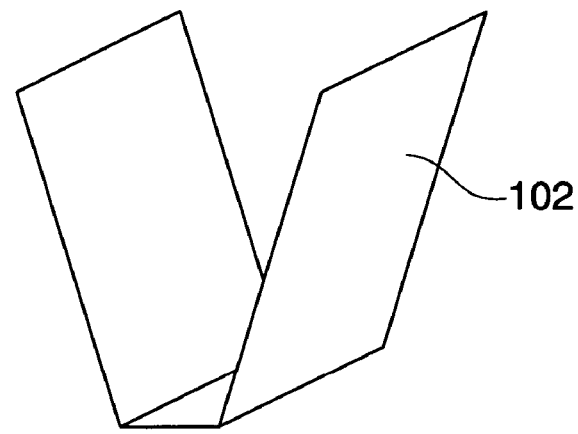
Figure 13C:
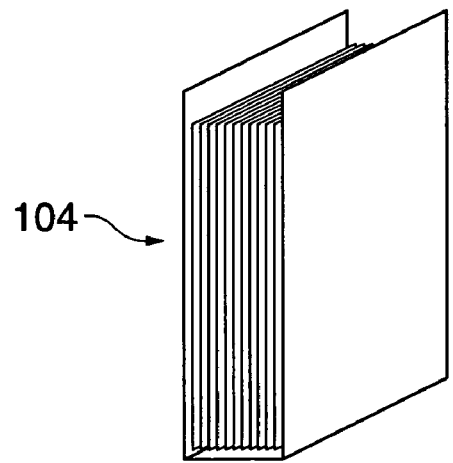

FIGS. 13A to 13C are perspective views useful in explaining the bookbinding process for bookbinding a printed sheet bundle carried out by the case binding unit. FIG. 13A shows a state where a glue application unit is applying glue to the back surface of the printed sheet bundle. FIG. 13B shows a sheet used as a cover. FIG. 13C shows a book with the attached cover.

In FIGS. 13A to 13C, in the case binding unit, the glue application unit 103 applies the glue to the back surface of the printed sheet bundle 101, which will be the body of the book. The printed sheet bundle 101 is then enclosed by the sheet 102 as the cover so as to be encased in the cover. The sheet 102 is brought in close contact with the back surface (glued surface) of the printed sheet bundle 101, to produce a book 104 with the cover. The glue for attaching the cover to the book body is solid at room temperature, and thus has to be heated into a liquid or paste state by a heater or the like before gluing. Moreover, the heater has to be operated for several minutes to heat the glue up to a temperature required for the gluing.

A description will now be given of the electrical connection between the main unit 1 of the image forming apparatus and the inserter 5, and a manner of control with reference to FIG. 2. The electrical connection between the main unit 1 of the image forming apparatus and the inserter 5 and the manner of control are similar to those between the main unit 1 of the image forming apparatus and the sheet feed devices 2, 3, and 4, between the image forming apparatus main unit 1 and the stacker 6, and between the image forming apparatus main unit 1 and the finisher 7.

Figure 2:
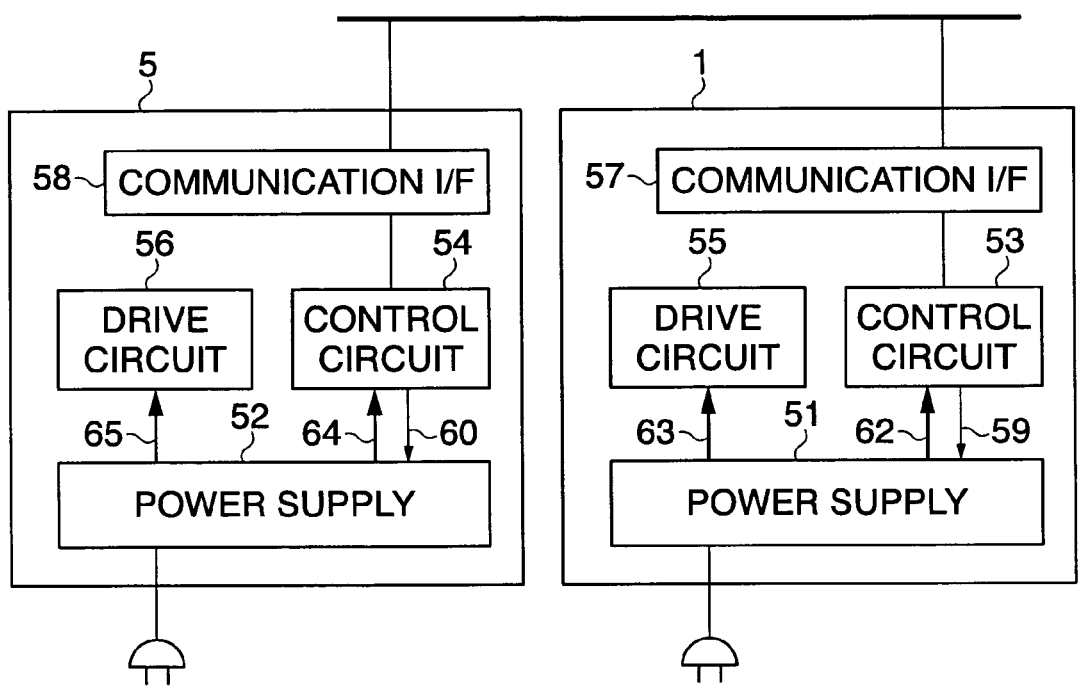
FIG. 2 is a schematic showing the electrical connection between a main unit of the image forming apparatus and an inserter appearing in FIG. 1.

FIG. 2 is a schematic showing the electrical connection between the main unit 1 of the image forming apparatus and the inserter 5 in FIG. 1.

As shown in FIG. 2, the main unit 1 of the image forming apparatus is comprised of a power supply 51, a control circuit 53, a drive circuit 55, and a communication I/F (interface) 57. Similarly, the inserter 5 is comprised of a power supply 52, a control circuit 54, a drive circuit 56, and a communication I/F 58.

The power supplies 51 and 52 are supplied with electric power from an external commercial power source. The drive circuits 55 and 56 are supplied with electric power from the power supplies 51 and 52 via power supply lines 63 and 65, to drive motors, solenoids, and clutches, not shown, provided inside the main unit 1 of the image forming apparatus and the inserter 5. The control circuits 53 and 54 are supplied with operating electric power via power supply lines 62 and 64.

The control circuits 53 and 54 communicate with external devices and other devices via the respective communication I/F's 57 and 58. The control circuit 53 is connected to the power supply 51 via a control line 59, and can stop the supply of electric power from the power supply 51 to the drive circuit 55 by instructing the power supply 51 to stop the supply of electric power via the control line 59. The control circuit 54 is connected to the power supply 52 via a control line 60, and can stop the supply of electric power from the power supply 52 to the drive circuit 56 by instructing the power supply 52 to stop the supply of electric power via the control line 60.

With this configuration, the main unit 1 of the image forming apparatus can transmit instructions to the inserter 5 to turn on or off power supply via the communication I/F 57. In the inserter 5, the control circuit 54 analyzes data (such as the instructions) received from the main unit 1 of the image forming apparatus via the communication I/F 58. If the received data is an instruction to turn off the power supply 52, the control circuit 54 instructs the power supply 52 to stop the supply of electric power via the control line 60 to thereby stop power supply from the power supply 52 to the drive circuit 56. If the received data is an instruction to turn on the power supply, the control circuit 54 instructs the power supply 52 to start the supply of electric power via the control line 50 to thereby start power supply from the power supply 52 to the drive circuit 56.

A description will now be given of the control circuit which carries out control of the image forming apparatus with reference to FIG. 3.

Figure 3:
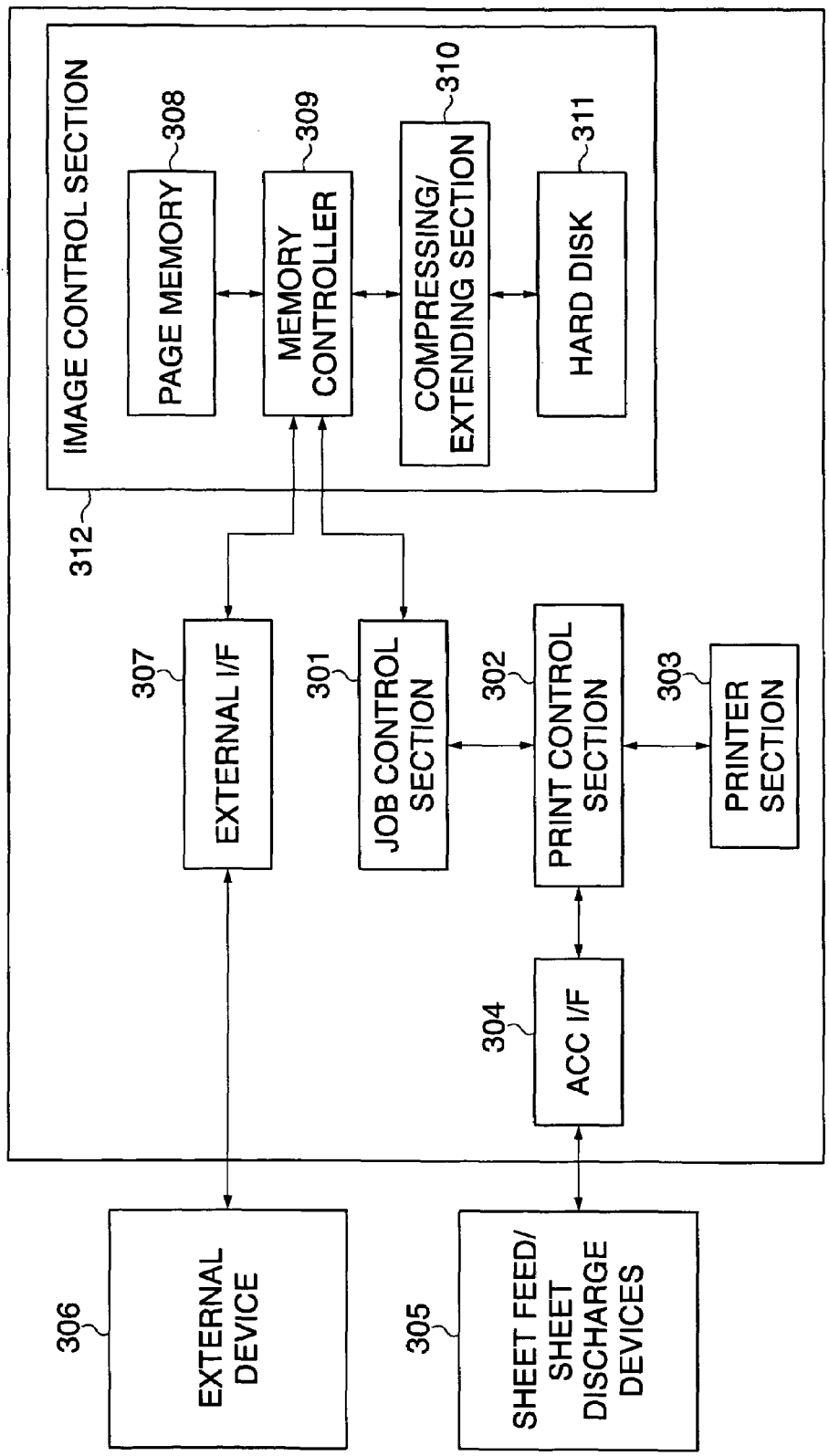
FIG. 3 is a diagram showing the electrical configuration of a control circuit of the image forming apparatus in FIG. 1 and peripheral devices.

FIG. 3 is a diagram showing an electrical configuration of a control circuit of the image forming apparatus in FIG. 1 along with peripheral components.

In FIG. 3, reference numeral 303 denotes a printer section corresponding to the main unit 1 of the image forming apparatus in FIG. 1; and 305, a sheet feed/sheet discharge devices. The sheet feed/discharge devices 305 include the sheet feed devices 2, 3, and 4, and the inserter 5, stacker 6, and finisher 7 as post-processing devices. Reference numeral 306 denotes an external device such as a personal computer (PC) or a scanner which transmits a print job to the image forming apparatus.

The print job is comprised of image data (image information) and print data (control information). The print data is comprised of sheet feed information indicative of a sheet feed device which is to supply the sheet P on which an image is printed based on the image data, and/or sheet discharge information indicative of a sheet discharge device to which the sheet P on which the image has been printed is discharged, and/or print information required to carry out the print such as information to start or finish the print job.

A print job transmitted from the external device 306 to the image forming apparatus is received by an external I/F 307 of the control circuit of the image forming apparatus. The print job received by the external I/F 307 is transmitted to a memory controller 309. The memory controller 309 extracts image data from the print job, and transmits the extracted image data to a compressing/expanding section 310. The transmitted image data, which is already compressed, is thus converted into internal data by the compressing/expanding section 310. The image data converted into the internal data is stored in a hard disk 311 as a storage device. Note that the storage device may be implemented by other high-capacity storage means in place of the hard disk 311.

On the other hand, the memory controller 309 extracts print data from the print job, and transmits the extracted print data to a job controller 301. Upon receiving the print data, the job controller 301 transmits an operation start instruction to a print controller 302 to start a print operation. Upon receiving the operation start instruction, the print controller 302 transmits an operation start instruction to the printer section 303, and also transmits an operation start instruction to devices selected from the sheet feed/discharge devices 305 to be used to carry out the print job (hereinafter referred to as the sheet feed/discharge devices 305 or the accessories to be used) via an ACC interface 304.

The job controller 301 requests the memory controller 309 to acquire image data on page-by-page basis when the printer section 303 and the sheet feed/discharge devices 305 have completed a preparatory operation thereof. The memory controller 309 reads out the image data converted into the internal data from the hard disk 311, causes the compressing/expanding section 310 to expand the read image data into bitmap data which can be printed by the printer section 303, and stores the bitmap data in a page memory 308.

The job controller 301 then transmits the bitmap data transmitted from the memory controller 309 to the printer section 303 via the print controller 302. The print controller 302 instructs the printer section 303 to form an image, instructs the sheet feed/discharge devices 305 via the ACC I/F 304 to start conveying the sheet P, and transmits information on a conveying path for the sheet P to a post-processing device as the accessories to be used.

When the print job is completed, the job controller 301 instructs the print controller 302 to finish the operation. The print controller 302 instructs the sheet feed/discharge devices 305 to finish the operation via the ACC I/F 304, and instructs the printer section 303 to finish the operation at the same time.

Upon receiving the next print job from the external device 306 via the external I/F 307 during execution of the print job, the memory controller 309 stores image data extracted from the received next print job in the hard disk 311 via the compressing/expanding section 310 as well as transmits print data extracted from the next print job to the job controller 301. When the print job being executed is completed, the next print job is then executed.

A description will now be given of the data structure of a print job with reference to FIGS. 4A to 4C. The print job is comprised of data divided into respective pages to be printed. Namely, the print job is composed of pieces of data corresponding in number to the number of the pages to be printed. The data for the respective pages have the same data structure.

Figure 4:
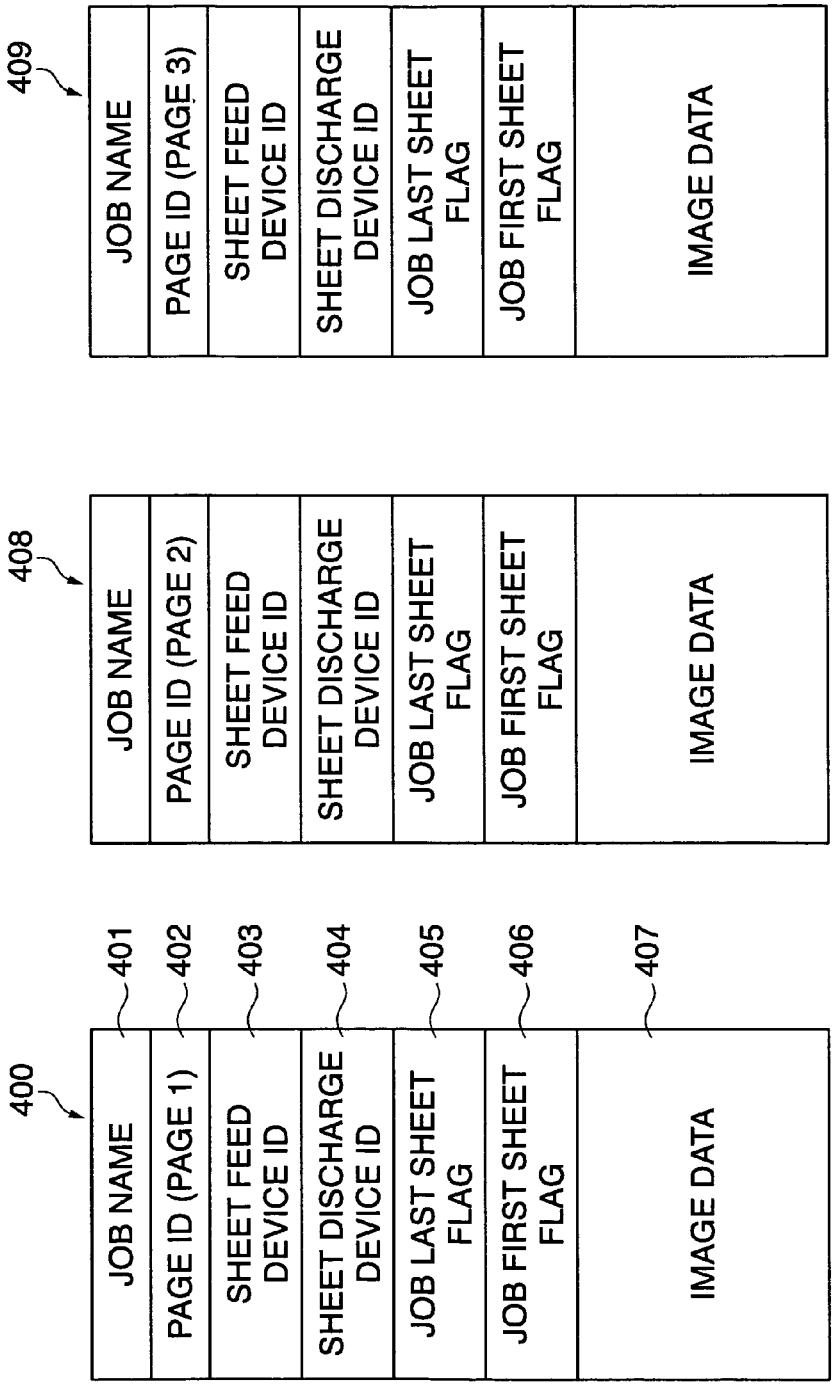
FIGS. 4A to 4C are schematic views showing the data structure of a print job, showing page data corresponding to a first page to a third page, respectively.

FIGS. 4A to 4C are schematics showing the data structure of the print job, showing page data corresponding to a first page to a third page, respectively.

FIGS. 4A to 4C show the page data 400, 408, and 409 corresponding to the three pages, respectively, contained in the print job. The page data 400, 408, and 409 have the same structure, and a description will thus be given of the structure of the page data 400 alone with reference to FIG. 4A.

In FIG. 4A, at a top part of the page data 400 is stored a job name 401 such as the name of a file to be transmitted or the user name. In the respective page data of the same job is stored the same job name.

A page ID 402 is stored next to the job name 401 (such as "page 1" and "page 2"). To the page ID 402 is assigned a unique number which is distinguishable from the other pages.

Following the page ID 402 is stored a sheet feed device ID 403 which indicates a sheet feed device from which the sheet P is to be fed. Following the sheet feed device ID 403 is stored a sheet discharge device ID 404 which indicates a post-processing device (sheet discharge device) onto which the sheet P is to be stacked, that is, a post-processing device which the sheet P is to finally reach. Following the sheet discharge device ID 404 is stored a job last sheet flag 405 which indicates that the page data 400 corresponds to the last image, and next to the job last sheet flag 405 is stored a job first sheet flag 406 which indicates that the page data 400 corresponds to the first image. Following the job first sheet flag 400 is stored image data 407.

The job controller 301 instructs the sheet feed/discharge devices 305 to start the preparatory operation via the print controller 302 and the ACC I/F 304 according to the sheet feed device ID 403 and the sheet discharge device ID 404 in the respective page data. Examples of the instruction to start the preparatory operation include the turn-on instruction described above with reference to FIG. 2. Moreover, the job controller 301 instructs the sheet feed/discharge devices 305 to stop the operation thereof. Examples of the instruction to stop the operation include an instruction to shift to a low power mode and the turn-off instruction described above with reference to FIG. 2.

A detailed description will now be given of a job control process carried out by the job controller 301 with reference to flowcharts in FIGS. 5 and 6.

Figure 5:
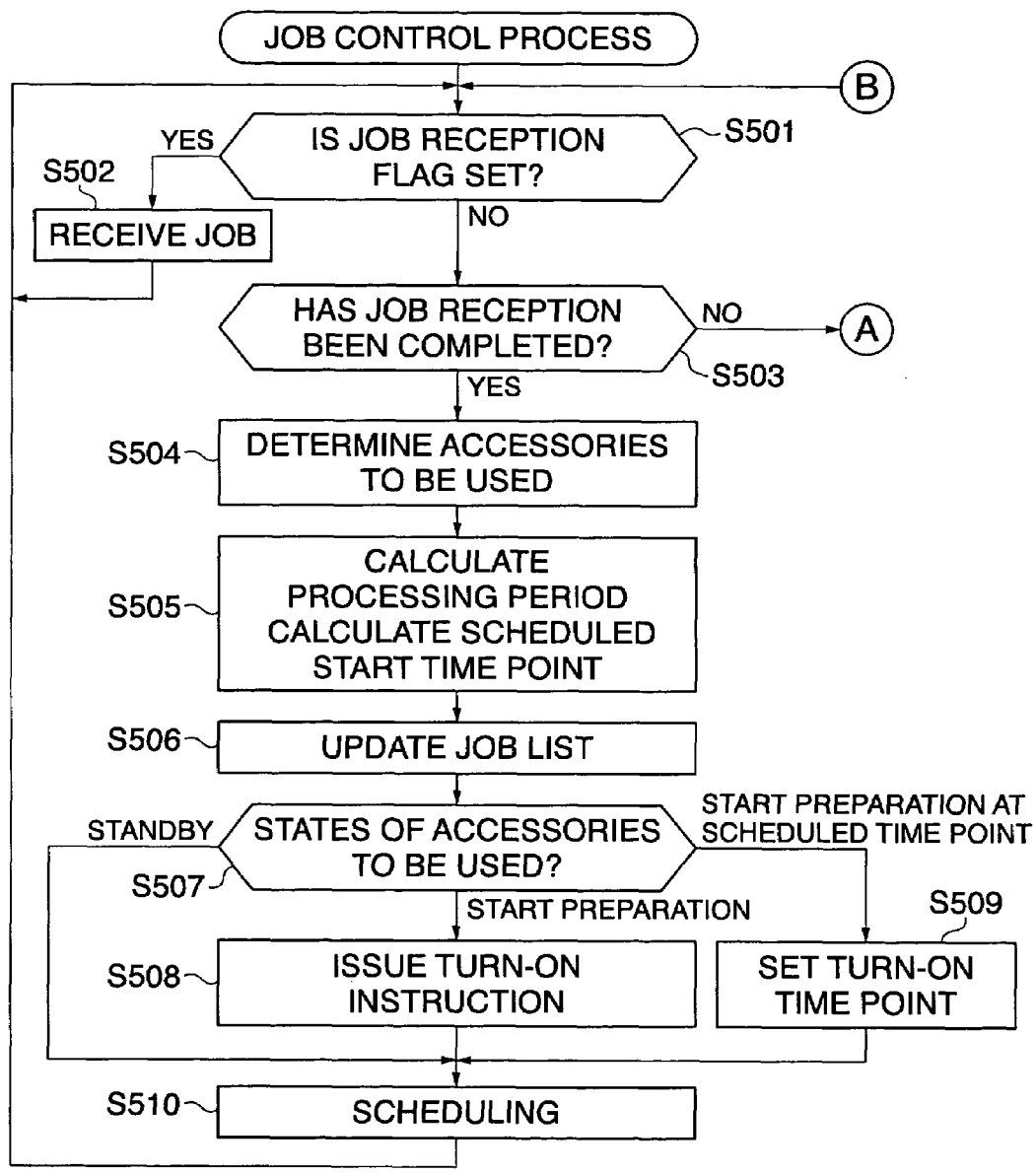
FIG. 5 is a flowchart showing a part of a job control process carried out by a job controller.
Figure 6:
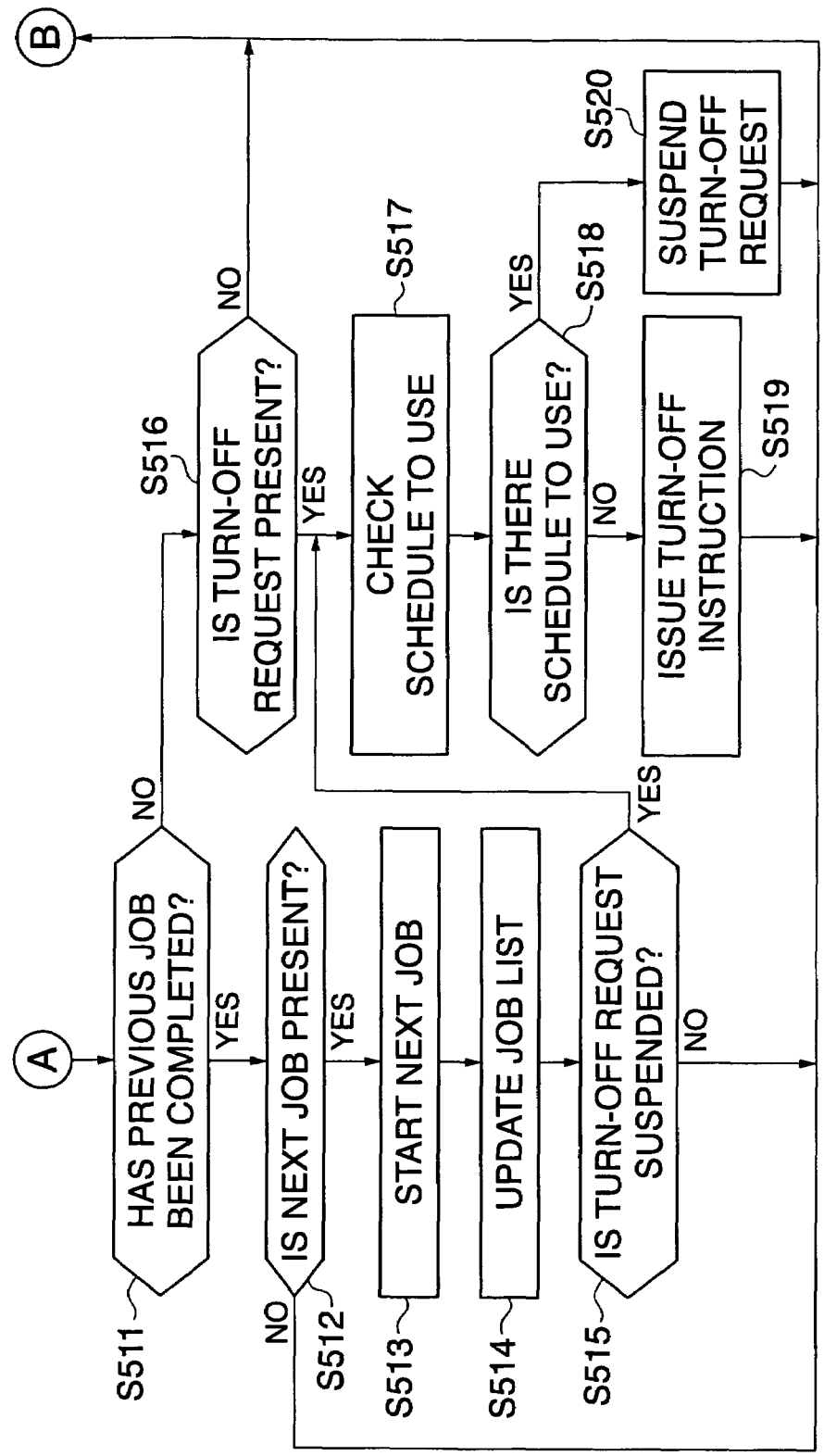
FIG. 6 is a flowchart showing a continued part of the job control process.

FIGS. 5 and 6 show the flowcharts showing the job control process carried out by the job controller 301.

As shown in FIG. 5, first, the job controller 301 determines whether or not a print job reception flag is set (step S501). The print job reception flag is set when the job controller 301 determines that reception of a print job is to be started, and is reset when the job controller 301 determines that the reception of the print job has been completed. If it is determined that the print job reception flag is set as a result of the determination in the step S501, the job control section 301 receives a print job (step S502), and then the process returns to the step S501. On the other hand, if it is determined that the print job reception flag is not set in the step S501, the process proceeds to a step S503.

In the step S503, it is determined whether or not all page data constructing the print job have been received, namely, the reception of the print job has been completed. As a result of this determination, if it is determined that the reception of the print job has been completed, the job controller 301 resets the print job reception flag, and then the process proceeds to a step S504. On the other hand, if the reception of the print job has not been completed, the process proceeds to a step S511 in FIG. 6.

In the step S504, the job controller 301 analyzes the sheet feed device ID 403 and the discharge destination ID 404 from all page data contained within the received print job, and determines one or more sheet feed devices and one or more post-processing devices used to carry out the print job (determines accessories to be used), and then the process proceeds to a step S505. Since the sheet feed devices and the post-processing devices are arranged inline as described above with reference to FIG. 1, the sheets P may simply pass some devices. However, these devices are also considered as devices to be used.

In the step S505, the job controller 301 calculates a processing time period required to carry out the print job, and a scheduled start time for starting the print job, and then the process proceeds to a step S506. The required processing time period to carry out the print job can be calculated based on productivity (processing capability) of the printer section 303, the number of the pages contained in the print job, and the like. Data on required time periods for carrying out various processes such as one-sided copying, double-sided copying, folding, and bookbinding are stored as a table in a memory, and the required processing time period is determined according to results of analysis of the job by referring to the table. The scheduled start time at which the print job is to be started is calculated based on a required processing time period for a print job currently spooled in the image forming apparatus and waiting for the start of the print process, and the present time point.

In the step S506, the job controller 301 adds the presently received print job to a job list which lists a job being presently executed and one or more jobs waiting for the start of the print process, to thereby update the job list and the process proceeds to a step S507. In the step S507, the job controller 301 checks the states of the respective sheet feed devices and post-processing devices determined in the step S504. If there is a device which should immediately start a preparatory operation such as the operation to turn on power supply, namely, if a time point (preparatory operation start time point) preceding the scheduled start time for the print job calculated in the step S505 by a time period required for the preparatory operation has already been reached or will be reached within a predetermined time period from the present time point, the process proceeds to a step S508. On the other hand, if there is a device which should start a preparatory operation such as the operation to turn on power supply at a predetermined time point, namely, if the preparatory operation for the device is to be started upon or after the lapse of a predetermined time period starting from the present time point, for example, the process proceeds to a step S509. If the preparatory operations of the respective sheet feed devices and post-processing devices have been completed, the process proceeds to a step S510.

In the step S508, the job controller 301 transmits an instruction to start the preparatory operation (turn-on instruction) to the print controller 302 if the time point (preparatory operation start time point) preceding the scheduled start time for the print job calculated in the step S505 by the time period required for the preparatory operation has already been reached, and the process proceeds to the step S510. If the start time point for the preparatory operation has already been reached, the job controller 301 immediately transmits the instruction to start the preparatory operation (preparatory start instruction).

In the step S509, the job controller 301 transmits the preparatory start instruction and the start time point for the preparatory operation (setting of the time point to turn on power supply) to the print controller 302, and the process proceeds to the step S510.

In the step S510, the job controller 301 carries out scheduling to optimize the order in which the print jobs spooled within the main unit 1 of the image forming apparatus are to be started, and the process returns to the step S501. The optimization of the order in which the print jobs are to be started refers to a process which changes the order in which successive two print jobs are to be executed if a preparatory operation of a sheet feed device used for a preceding print job takes much time, so that the main unit 1 of the image forming apparatus stays in an idle state (a state in which the start of image formation is waited for) until the sheet feed device becomes ready to start the operation, and the following print job scheduled to be carried out after the preceding print job is however immediately executable, for example. Moreover, if the change of the order causes a delay in completion of a job scheduled to be carried out earlier, the change of the order may not be carried out.

In FIG. 6, the job controller 301 determines whether or not the print job (preceding job) being presently executed has been completed in the step S511. If the job has been completed, the process proceeds to a step S512. On the other hand, if the job has not been completed, the process proceeds to a step S516. In the step S512, the job controller 301 refers to the job list to check whether or not a next job has been spooled. If there is a spooled next job, the process proceeds to a step S513. On the other hand, there is no spooled next job, the process returns to the step S501.

In the step S513, the job controller 301 instructs the print controller 302 to start the next job, and the process proceeds to a step S514. In the step S514, the job controller 301 updates the job list. Namely, the job controller 301 deletes the completed job from the job list, and sets the state of the started job from a standby state to a running state. In the next step S515, the job controller 301 checks whether or not there is suspended a request for turning off power supply (turn-off request), which will be described later. If a turn-off request is suspended, the process proceeds to a step S517. On the other hand, if no turn-off request is suspended, the process returns to the step S501.

If the result of the step S511 is negative ("NO"), namely the presently executed job has not been completed, the process proceeds to the step S516. In the step S516, the job controller 301 checks whether or not there is a turn-off request from a sheet feed device or a post-processing device. If there is a turn-off request, the process proceeds to the step S517. On the other hand, if there is no turn-off request, the process returns to the step S501. The sheet feed devices and post-processing devices transmit a turn-off request to the main unit 1 of the image forming apparatus when a predetermined standby time period assigned thereto elapses, or when the operator turns off the power switch.

In the step S517, the job controller 301 refers to the job list to check a schedule to use the device which has transmitted the turn-off request, and then the process proceeds to a step S518. In the step S518, the job controller 301 determines whether or not the device which has transmitted the turn-off request is scheduled to be used. If the device is scheduled to be used, the process proceeds to a step S520. On the other hand, if the device is not scheduled to be used, the process proceeds to a step S519.

In the step S519, the job controller 301 transmits a turn-off instruction to the print controller 302, and the process returns to the step S501. The print controller 302 transmits a permission to turn off power supply (turn-off permission) to the device which has transmitted the turn-off request via the ACC I/F 304. The device which has received the turn-off permission turns off power supply (enters a standby state). In the step S520, the job controller 301 determines that there is spooled a job which will use the device which has transmitted the turn-off request since the determination result is affirmative ("YES") in the step S518, and suspends (records) the turn-off request, and the process returns to the step S501.

A detailed description will now be given of a print control process carried out by the print controller 302 in FIG. 3 with reference to a flowchart in FIG. 7.

Figure 7:
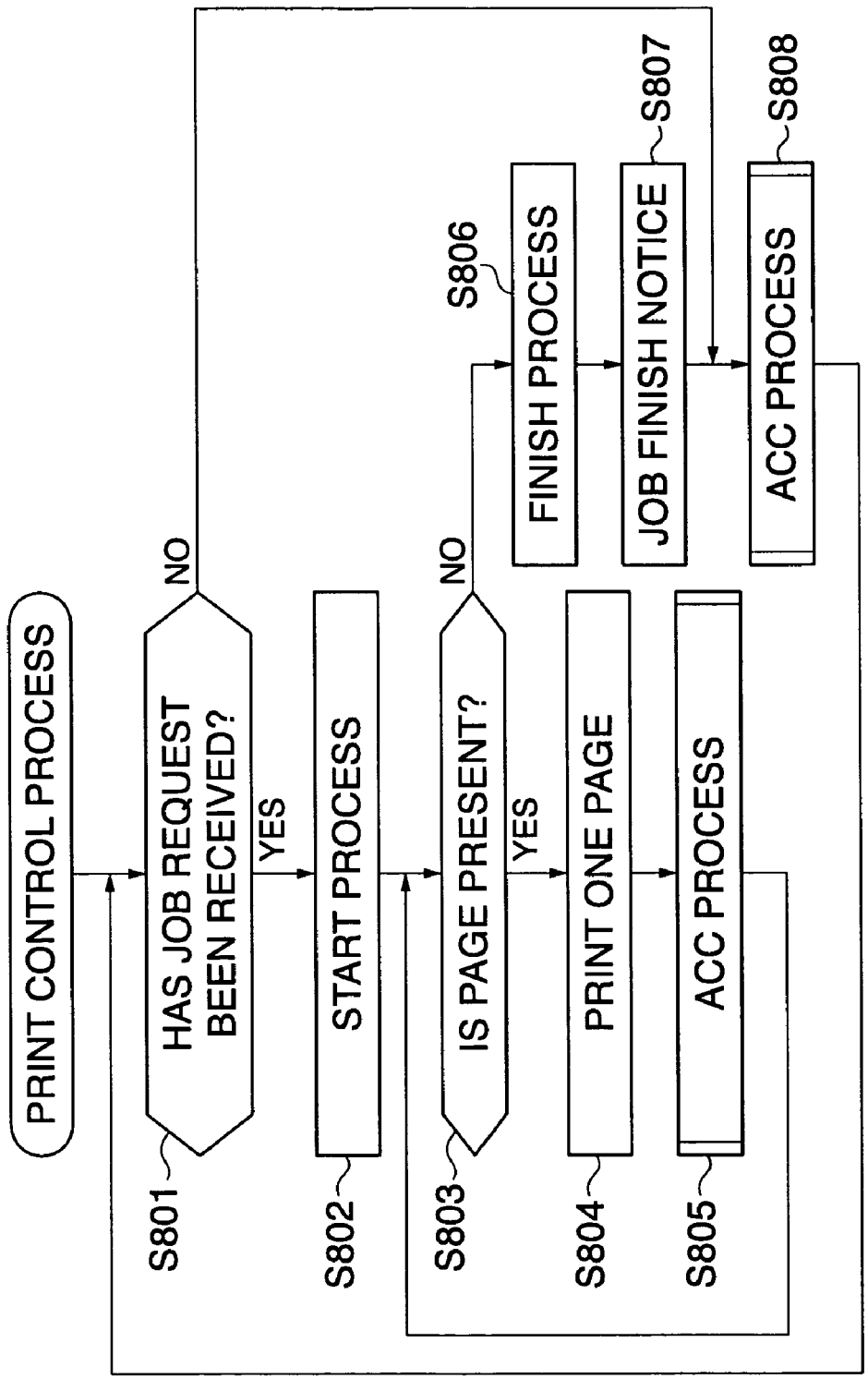
FIG. 7 is a flowchart showing a print control process carried out by a print controller in FIG. 3.

FIG. 7 is a flowchart showing the print control process carried out by the print controller 302 in FIG. 3.

First in a step S801, the print controller 302 determines whether or not there has been received a preparatory start instruction and/or a start time point for a preparatory operation (job request) from the job controller 301. Upon receiving the job request, the process proceeds to a step S802. Otherwise, the process proceeds to a step S808.

In the step S802, the print controller 302 instructs the printer section 303 and predetermined sheet feed/discharge devices 305 (devices actually relating to the execution of the print job (accessories to be used) selected from the sheet feed/discharge devices 305) to start a print operation (start process), and the process proceeds to a step S803. The print controller 302 determines whether or not there is image data to be printed, namely one or more pages to be printed in the step S803. If there is one or more pages to be printed, the process proceeds to a step S804, where the print controller 302 carries out instructs the print section 303 and the predetermined sheet feed/discharge devices 305 to carry out a print operation corresponding to one page (one-page print), carries out an ACC process, described in detail later, in a step S805, and the process returns to the step S803.

On the other hand, if the result of the determination of the step S803 is negative ("NO"), namely there is no page to be printed in the step S803, the print controller 302 carries out a finish process, where the print controller 302 instructs the accessories to be used to finish the print operation, in a step S806, then instructs the printer section 303 and the predetermined sheet feed/discharge devices 305 to finish operations thereof (job finish notice) (step S807), and then carries out the ACC process, described in detail later, in a step S808, and the process returns to the step S801.

A description will now be given of the ACC process carried out in the steps S805 and S808 in FIG. 7 with reference to a flowchart in FIG. 8.

Figure 8:
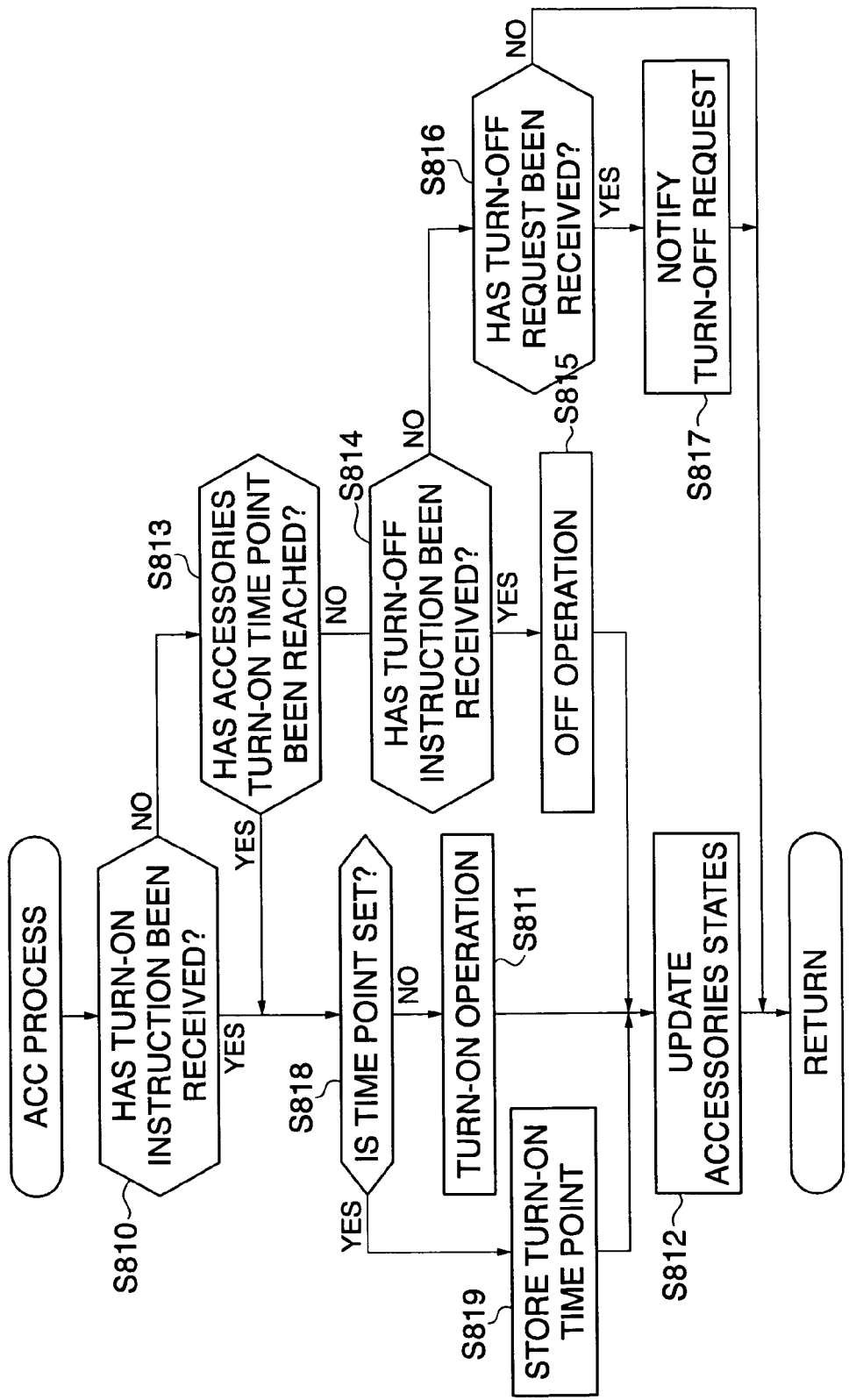
FIG. 8 is a flowchart showing an ACC process carried out in steps S805 and S808 in FIG. 7.

FIG. 8 is the flowchart showing the ACC process carried out in the steps S805 and S808 in FIG. 7.

First, in a step S810, the print controller 302 first determines whether or not there has been received a preparatory start instruction (turn-on instruction) described above with respect to the steps S508 and S509 in FIG. 5 from the job controller 301. If a preparatory start instruction has been received, the process proceeds to a step S818. On the other hand, if no preparatory start instruction has been received, the process proceeds to a step S813.

In the step S818, the print controller 302 determines whether or not a start time point for a preparatory operation is set in the preparatory start instruction. If the result of the determination is affirmative ("YES"), the process proceeds to a step S819, where the print controller 302 stores the start time point for the preparatory operation (turn-on time point), and then the process proceeds to a step S812. On the other hand, if the determination result is negative ("NO") in the step S818, namely no start time point for the preparatory operation is set, the process proceeds to a step S811, where the print controller 302 transmits a preparatory start instruction to the predetermined sheet feed/discharge device 305 (turn-on operation), and then the process proceeds to a step S812.

The print controller 302 holds information indicative of the states of the respective sheet feed/discharge devices 305 as an information list shown in FIG. 9, described later, and, in the step S812, updates the information which is changeable according to results of execution of the respective steps in FIG. 8.

In a step S813, the print controller 302 determines whether or not a start time point for a preparatory operation (ACC turn-on time point) previously stored has been reached. If a start time point for a preparatory operation has been reached, the process proceeds to a step S818. On the other hand, if no start time point for a preparatory operation has been reached, the process proceeds to a step S814. In the step S814, the print controller 302 determines whether or not a turn-off instruction has been received from the job controller 301 as described above with respect to the step S519 in FIG. 5. If a turn-off instruction has been received, the process proceeds to a step S815, where the print controller 302 transmits a turn-off instruction to one or more devices which are not scheduled to be used (OFF operation), and then the process proceeds to the step S812. On the other hand, if no turn-off instruction has been received, the process proceeds to a step S816.

In the step S816, the print controller 302 determines whether or not there has been received a turn-off request from the sheet feed/discharge devices 305. If there has been received a turn-off request, the process proceeds to a step S817, where the print controller 302 notifies the job controller 301 of the turn-off request, and the process returns to the print control process of FIG. 7. On the other hand, if there has not been received a turn-off request, the process immediately returns to the print control process of FIG. 7.

A description will now be given of the information list held by the print controller 302 with reference to FIG. 9.

FIG. 9 is a diagram showing the information list held by the print controller 302, and indicative of the respective states of the devices constituting the sheet feed/discharge devices 305.

As shown in FIG. 9, the information list includes first to fifth list items 850 to 854, for example. In a column of the first list item 850 are shown device names of the respective devices constituting the sheet feed/discharge devices 305; in a column of the second list item 851, the states of the respective devices; in a column of the third list item 852, required preparatory time periods for the respective devices; in a column of the fourth item 853, preparatory start time points (scheduled turn-on time points) for the respective devices; and in a column of the fifth list item 854, presences/absence of a turn-off request from the respective devices. Namely, the information list shows the state, required preparatory time period, preparatory start time point, and presence/absence of a turn-off request of the respective sheet feed/discharge devices 305 in association with the device names thereof.

Referring to the device names shown under the first list item 850, "FIN" denotes the finisher 7; "BOOK", the case binding device 42 in the finisher 7; "STK", the stacker 6; "INS", the inserter 5; "POD1", the sheet feed device 2; "POD2", the sheet feed device 3; and "POD3", sheet feed device 4.

Referring to the states of the respective devices shown under the second list item 851, "DOWN" denotes a power-off state or a power saving state, "RUNNING" denotes the operating state; and "WARMUP" denotes the preparatory state. A state which is not the running state but a state where the preparatory has been completed, is denoted by "STBY".

Under the third list item 852 are shown required preparatory time periods in minute, for example, for the respective devices. For example, in the example shown in FIG. 9, the required preparatory time period for the finisher 7 (FIN) is 0 minutes (0 min), while the required preparatory time period for the case binding device 42 (BOOK) is 10 minutes (10 min). This is because it takes approximately ten minutes for solid glue to melt into a paste or liquid state by a heater for the case binding.

Although the sheet feed devices 2 (POD1), 3 (POD2), and 4 (POD3) have the same construction, the required preparatory time periods therefor are different from each other in the example shown in FIG. 9. This is because how the preparatory operation is carried out varies depending on the sheets P stacked on the sheet feed devices, as described before.

Under the fourth list item 853 are recorded preparatory start time points (scheduled turn-on time points) if scheduled. The fifth list item 854 shows the presence/absence of a power-off request. "YES" denotes the presence of a power-off request received from a corresponding sheet feed/discharge device 305, and "NO" denotes the absence thereof.

According to the above configuration, an instruction to start the preparatory operation of each device can be issued in optimal timing.

A description will now be given of the job list used to manage jobs received from the external device 306 with reference to FIGS. 10A to 10C.

FIG. 10A is a diagram showing an example of the job list, FIG. 10B is a diagram showing a newly received job, and FIG. 10C is a diagram showing a job list updated according to the newly received job.

In FIG. 10A, the job list 600 includes first to sixth list items 601 to 606, which respectively indicate the name of a job, the type of a first sheet feed device used for the job, the type of a second sheet feed device used for the job, the type of a post-processing device (sheet discharge device) to which sheets P are discharged, a required processing time period for the job, and a scheduled start time for the job.

For example, it is assumed that a job JOB1 is running or being executed while jobs JOB2 and JOB3 are on standby at a certain time point (11:30 in this case). The sheet feed device used for the jobs JOB1 to JOB3 is POD1 (sheet feed device 2 in FIG. 1). The post-processing device used for the jobs JOB1 to JOB3 is STK (stacker 6 in FIG. 1). The respective required processing time periods for the jobs JOB1 to JOB3 are 5 minutes, 10 minutes, and 10 minutes. The job JOB1 has been started at 11:29, which is earlier than the present time point, 11:30. Respective scheduled start times for the jobs JOB2 and JOB3 are 11:34 and 11:44.

Next, it is assumed that a new job 607 (FIG. 10B) has been received from the external device 306, with the name of the job being JOB4, the sheet feed device 2 and the stacker 6 being used for the job, and the required processing time period for the job JOB4 being five minutes. If the sheet feed devices and the post-processing devices are in the respective states described above with reference to FIG. 9 on this occasion, the inserter 5 (INS) is still in the down state. It will be thus learned that twenty minutes are required for the preparatory operation of the inserter 5 to be completed.

On the other hand, a scheduled start time for the job JOB4 is 11:54, which is obtained by adding the required processing time period (ten minutes) for the job JOB3 to the scheduled start time (11:44) for the job JOB3. It will be thus learned that the preparatory operation of the inserter 5 must be started at 11:34 (refer to FIG. 9), which is obtained by subtracting the required preparatory time period for the inserter 5, twenty minutes, from the scheduled start time for the job JOB4 11:54. As a result, the job list 600 is updated to a job list 608 shown in FIG. 10C.

A description will now be given of the scheduling carried out in the step S510 in FIG. 5 with reference to FIGS. 11A to 11F.

FIGS. 11A to 11F are diagrams useful in explaining an example of the job scheduling carried out in the step S510 in FIG. 5. FIG. 11A is a diagram showing a job list. FIG. 11B is a diagram showing a first newly received job. FIG. 11C is a diagram showing a job list after the first newly received job is added. FIG. 11D is a diagram showing a second newly received job. FIG. 11E is a diagram showing a job list generated on the assumption that the second newly received job is carried out subsequently to the first newly received job. FIG. 11F is a diagram showing a job list generated by updating the job list shown in FIG. 11C with addition of the second newly received job to be carried out prior to the first newly received job.

In FIG. 11A, reference numeral 700 denotes an example of the job list at a certain time point (11:30 in this case). As described above with reference to FIG. 10A, the job list includes the first to sixth list items, which are the name of a job, the respective types of first and second sheet feed devices and post-processing device (sheet discharge device) used for the job, a required processing time period for the job, and a scheduled start time for the job.

In the job list 700 shown in FIG. 11A, the sheet feed device and post-processing device used for both jobs JOB1 and JOB2 are POD1 and STK (the sheet feed device 2 and the stacker 6 in FIG. 1), respectively. The required processing time periods for the jobs JOB1 and JOB2 are five and ten minutes, respectively. The job JOB1 was started at 11:29, and the scheduled start time for the job JOB2 is thus 11:34.

Next, it is assumed that the first newly received job 701 is then received from the external device 306, with the name of the first newly received job 701 being JOB3, the sheet feed device 2 (POD1) and the inserter 5 (INS) being used for the job as sheet feed devices, and the stacker 6 (STK) being used for the job as a post-processing device, and the required processing time period being five minutes. If the sheet feed devices and post-processing device are in the respective states shown in FIG. 9 on this occasion, the inserter 5 (INS) is presently in the down state, and thus twenty minutes are required for the preparatory operation of the inserter 5 to be completed.

On the other hand, the scheduled start time for the first newly received job JOB3 is calculated as 11:44 from the scheduled start time and required processing time period for the job JOB2. However, the preparatory operation of the inserter 5 takes twenty minutes to complete, and thus the scheduled start time for the job JOB3 is 11:50, which is obtained by adding the required time period, twenty minutes, to the present time point, 11:30. As a result, the job list 700 is updated by adding the job JOB3 to the job list 702 shown in FIG. 11C.

It is assumed that the second newly received job 703 is received from the external device 306, with the name of the second newly received job 703 being JOB4, the sheet feed device 2 (POD1) and the stacker 6 (STK) being used for the job as a sheet feed-device and a post-processing device, respectively, and the required processing time period being five minutes. On this occasion, if the second newly received job JOB4 is carried out after the first newly received job JOB3, the job list 702 is updated to a job list 704a shown in FIG. 11E, and the scheduled start time for the job JOB4 is 12:00.

On the other hand, if the order in which the first and second newly received jobs JOB3 and JOB4 are carried out is switched to an order in which the job JOB4 is executed before the job JOB3, the job list 702 is updated to a job list 704b shown in FIG. 11F, according to which both the jobs JOB3 and JOB4 can be executed without changing the scheduled start time for the job JOB3. In such a case, an operation to switch the jobs JOB3 and JOB4 is thus carried out.

On the other hand, if the required processing time period for the second newly received job JOB4 is 30 minutes, for example, and the order in which the first and second newly received jobs JOB3 and JOB4 are carried out is switched, the scheduled start time for the first newly received job JOB3 will be delayed compared with the case where the order in which both the jobs are carried out is not switched, and the switching is thus not carried out. However, it may be configured such that switching of the order in which jobs are carried out can be selectively allowed or inhibited even when the scheduled start time is delayed as the result of the switching.

A description will now be given of an operation upon a request for turning off power supply with reference to FIG. 12.

FIG. 12 is a diagram showing a job list useful in explaining the operation upon a request for turning off power supply.

It is assumed that the job list in FIG. 12 show how jobs are spooled at a certain time point. In this state, if a request for turning off power supply is received from the inserter 5, for example, the job JOB3 is scheduled to use the inserter 5, and the request for turning off power supply is thus suspended. When the job JOB3 is completed, the job list is referred to again to check whether or not a job scheduled to use the inserter 5 has been added. Only if such a job has not been added, a permission to turn off the power is transmitted to the inserter 5.

According to the above described embodiment, the sheet feed device ID 403 and the sheet discharge device ID 404 of a print job received from the external device 306 are analyzed to determine sheet feed/discharge devices 305 used to carry out the print job (step S504), the states of the determined sheet feed/discharge devices 305 are checked to determine sheet feed/discharge devices 305 which should start the preparatory operation before the print job is executed (step S507), and the determined sheet feed/discharge devices 305 are caused to start the preparatory operation so as to complete the preparatory operation before the start of the print job (steps S508 and S509). As a result, the sheet feed devices and post-processing devices can be brought into operate states in optimal timing for execution of the print job, thereby increasing the productivity and operation rate of the image forming apparatus, and saving the energy.

The present invention is not limited to the above described embodiment, and various modifications thereto are possible.

For example, although in the above described embodiment, the present invention is applied to an image forming apparatus provided with three sheet feed devices (pre-processing devices) and three post-processing devices, the image forming apparatus should not necessarily be provided with a plurality of pre-processing devices and a plurality of post-processing devices, and may be provided with at least one pre-processing device and at least one post-processing device. Moreover, the image forming apparatus should not necessarily be provided with a post-processing device having the bookbinding function.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-221820 filed Jul. 29, 2004, which is hereby incorporated-by reference herein.

What is claimed is;
1. An image forming apparatus comprising:
at least one sheet feed device that supplies sheets;
an image forming device that forms an image on a sheet supplied from said sheet feed device by executing a print job;
at least one post-processing device that carries out post-processing including bookbinding on the sheet having the image formed thereon;
a receiving device that received the print job;
a first determining device that analyzes the received print job and determines said sheet feed device and said post-processing device to be used in executing the print job, based on a result of the analysis;
a second determining device that checks states of the determined sheet feed device and post-processing device and determines at least one of said sheet feed device and said post-processing device to be caused to start a preparatory operation in advance before the print job is executed, based on a result of the checking;
a control device that turns on power supply to the determined at least one of the sheet feed device and post-processing device in timing such that the preparatory operation of the determined at least one of the sheet feed device and post-processing device is completed in time for start of execution of the print job;
a first calculating device that calculates a processing time period required for execution of the received print job, based on the print job and processing capability of said image forming device;
a second calculating device that calculates a scheduled start time for starting execution of the print job, based on the calculated processing time period, and a time period required for the preparatory operation of the determined at least one of the sheet feed device and post-processing device;

a storage device that stores the calculated processing time period and the calculated scheduled start time together with the received print job; and a print control device that sequentially reads out the stored print job according to the calculated scheduled start time and causes said image forming device to carry out image formation;

wherein said control device turns on power supply to the determined at least one of the sheet feed device and post-processing device in timing such that the preparatory operation of the determined at least one of the sheet feed device and post-processing device is completed in time for the calculated scheduled start time; and wherein said control device causes said image forming device to execute a second print job received subsequently to the received print job, before execution of the received print job, when determining that the preparatory operation of the determined at least one of the sheet feed device and post-processing device is not completed in time for the calculated scheduled start time in sequentially reading out the stored print job according to the calculated scheduled start time and causing said image forming device to carry out image formation.

2. An image forming apparatus as claimed in claim 1, wherein said control device causes said image forming device to execute the received print job after completion of the preparatory operation of the determined at least one of the sheet feed device and post-processing device without executing the second print job before execution of the received print job, when determining that the image formation based on the received print job is completed later than when the second print job is not executed before execution of the received print job, due to execution of the second print job before execution of the received print job.

3. An image forming apparatus comprising:

at least one sheet feed device that supplies sheets;

an image forming device that forms an image on a sheet supplied from said sheet feed device by executing a print job;

at least one post-processing device that carries out post-processing including bookbinding on the sheet having the image formed thereon;

a receiving device that received the print job;

a first determining device that analyzes the received print job and determines said sheet feed device and said post-processing device to be used in executing the print job, based on a result of the analysis;

a second determining device that checks states of the determined sheet feed device and post-processing device and determines at least one of said sheet feed device and said post-processing device to be caused to start a preparatory operation in advance before the print job is executed, based on a result of the checking; and a control device that turns on power supply to the determined at least one of the sheet feed device and post-processing device in timing such that the preparatory operation of the determined at least one of the sheet feed device and post-processing device is completed in time for start of execution of the print job;

wherein said sheet feed device and said post-processing device each have a request device that issues a request to said control device to permit switching of power supply to a corresponding one of said sheet feed device and said post-processing device when power supply to the corresponding one of said sheet feed device and said post-processing device is to be switched; and wherein said control device does not accept the request from said request device when determining that said sheet feed device or said post-processing device, of which the request device has issued the request, is required for execution of the print job stored in said storage device.

4. An image forming apparatus as claimed in claim 3, wherein when said control device does not accept the request for permission of switching of power supply from said request device, said control device stores the request in said storage device, and reads out the stored request and turns off power supply to said sheet feed device or said post-processing device that issued the request, upon completion of execution of the print job using said sheet feed device or said post-processing device that issued the request.

5. A control method for an image forming apparatus including at least one sheet feed device that supplies sheets, an image forming device that forms an image on a sheet supplied from the sheet feed device by executing a print job, at least one post-processing device that carries out post-processing including bookbinding on the sheet having the image formed thereon, and a receiving device that received the print job, the control method comprising:

a first determining step of analyzing the received print job and determining the sheet feed device and the post-processing device to be used in executing the print job, based on a result of the analysis;

a second determining step of checking states of the determined sheet feed device and post-processing device and determining at least one of the sheet feed device and the post-processing device to be caused to start a preparatory operation in advance before the print job is executed, based on a result of the checking; and a control step of turning on cower supply to the determined at least one of the sheet feed device and post-processing device in timing such that the preparatory operation of the determined at least one of the sheet feed device and post-processing device is completed in time for start of execution of the print job;

a calculating step of calculating a processing time period required for execution of the received print job, based on the print job and processing capability of the image forming device, and calculating a scheduled start time for starting execution of the print job, based on the calculated processing time period, and a time period required for the preparatory operation of the determined at least one of the sheet feed device and post-processing device;

a storage step of storing the calculated processing time period and the calculated scheduled start time in a storage device together with the received print job; and a print control step of sequentially reading out the stored print job according to the calculated scheduled start time and causing said image forming device to carry out image formation;

wherein in said control step, power supply to the determined at least one of the sheet feed device and post-processing device is turned on in timing such that the preparatory operation of the determined at least one of the sheet feed device and post-processing device is completed in time for the calculated scheduled start time; and wherein in said control step, the image forming device is caused to execute a second print job received subsequently to the received print job, before execution of the received print job, when it is determined that the preparatory operation of the determined at least one of the sheet feed device and post-processing device is not completed in time for the calculated scheduled start time in sequentially reading out the stored print job according to the calculated scheduled start time and causing the image forming device to carry out image formation.

6. A control method for an image forming apparatus as claimed in claim 5, wherein in said control step, the image forming device is caused to execute the received print job after completion of the preparatory operation of the determined at least one of the sheet feed device and post-processing device without executing the second print job before execution of the received print job, when it is determined that the image formation based on the received print job is completed later than when the second print job is not executed before execution of the received print job, due to execution of the second print job before execution of the received print job.

7. A control method for an image forming apparatus including at least one sheet feed device that supplies sheets, an image forming device that forms an image on a sheet supplied from the sheet feed device by executing a print job, at least one post-processing device that carries out post-processing including bookbinding on the sheet having the image formed thereon, and a receiving device that received the print job, the control method comprising:
 a first determining step of analyzing the received print job and determining the sheet feed device and the post-processing device to be used in executing the print job, based on a result of the analysis;
 a second determining step of checking states of the determined sheet feed device and post-processing device and determining at least one of the sheet feed device and the post-processing device to be caused to start a preparatory operation in advance before the print job is executed, based on a result of the checking; and
 a control step of turning on cower supply to the determined at least one of the sheet feed device and post-processing device in timing such that the preparatory operation of the determined at least one of the sheet feed device and post-processing device is completed in time for start of execution of the print job;
 wherein in said control step, a request for permission of switching of power supply from the sheet feed device or the post-processing device is not accepted when it is determined that the sheet feed device or the post-processing device, which has issued the request, is required for execution of the print job stored in the storage device.

8. A control method for an image forming apparatus as claimed in claim 7, wherein when in said control step, the request for permission of switching of power supply is not accepted, in said control step, the request is stored in the storage device, and the stored request is read out and power supply to the sheet feed device or the post-processing device that issued the request is turned off, upon completion of execution of the print job using the sheet feed device or the post-processing device that issued the request.

9. An image forming apparatus as claimed in claim 1, wherein said control device issues instructions for turning on or off power supply to the sheet feed device and power supply to the post-processing device, independently of each other, and said control device issues an instruction for turning on power supply to the determined at least one of the sheet feed device and post-processing device to cause the determined at least one of the sheet feed device and post-processing device to start the preparatory operation.

10. A control method for an image forming apparatus as claimed in claim 5, wherein said control step includes a step of issuing instructions for turning on or off power supply to the sheet feed device and power supply to the post-processing device, independently of each other, and in said control step, an instruction is issued for turning on power supply to the determined at least one of the sheet feed device and post-processing device to cause the determined at least one of the sheet feed device and post-processing device to start the preparatory operation.

* * * * *